United States Patent [19]

White et al.

[11] 4,154,092

[45] May 15, 1979

[54] PNEUMATIC GROSS LEAK DETECTOR

[75] Inventors: James W. White; Victor W. Ruwe, both of Huntsville, Ala.

[73] Assignee: The United States of America as represented by the Secretary of the Army, Washington, D.C.

[21] Appl. No.: 902,595

[22] Filed: May 4, 1978

[51] Int. Cl.² ............................................ G01M 3/32
[52] U.S. Cl. .................................... 73/49.3; 73/49.4; 73/52
[58] Field of Search ................... 73/40, 49.3, 49.4, 52

[56] References Cited

U.S. PATENT DOCUMENTS

| 2,329,035 | 9/1943 | Cross | 73/49.4 |
| 2,467,767 | 4/1949 | Mertler | 73/49.3 |
| 2,749,743 | 6/1956 | Foster | 73/49.3 |
| 3,343,404 | 9/1967 | La Rosa et al. | 73/49.3 |
| 3,431,773 | 3/1969 | Calhoun | 73/49.3 |
| 4,047,422 | 9/1977 | Lyssy | 73/49.3 X |

Primary Examiner—Charles Gorenstein
Attorney, Agent, or Firm—Nathan Edelberg; Robert P. Gibson; Harold W. Hilton

[57] ABSTRACT

A pneumatic gross leak detector for testing micro-electronic packages. The apparatus includes a frame having a vertically movable upper section and a stationary lower section. A chamber is provided with walls which are secured to the upper section for movement therewith. The chamber includes upper, lower and intermediate portions disposed in communication. A test chamber base is secured to the lower stationary section to receive the microelectronic package therein. A first piston is provided in the upper chamber portion for moving the upper frame section downwardly for sealing engagement for the lower chamber portion with the test chamber base. A second piston is provided for compressing air in the lower chamber portion to a predetermined value. A readout device communicates into the test chamber to indicate if compressed air in the lower chamber leaks into the micro-electronic package.

2 Claims, 2 Drawing Figures

PNEUMATIC GROSS LEAK DETECTOR

DEDICATORY CLAUSE

The invention described herein may be manufactured, used, and licensed by or for the Government for governmental purposes without the payment to us of any royalties thereon.

BACKGROUND OF THE INVENTION

Test procedure for fluorocarbon gross leak test requires the device be inserted into the combination vacuum/pressure vessel and reduce the ambient pressure to less than five tarr for 30 minutes. Then without breaking vacuum, a sufficient quantity of leak detecting fluid to cover the device shall be drawn into the vacuum/pressure vessel through a transfer tube from a container of leak detecting fluid. For devices with an internal cavity volume of 0.1 cc or less, the pressure in the vessel shall be increased and maintained at 75 psig for a duration of one hour minimum. For devices with an internal cavity volume in excess of 0.1 cc a minimum pressure of 30 psig shall be applied and maintained for a duration of two hours minimum.

The pressure is released and the device shall be removed from the pressure vessel and retained immersed in a bath containing the leak detecting fluid. The device is removed from the leak detecting fluid and dried in air for three minutes. The device shall be immersed in the leak indicator fluid, which is maintained at 125°±5° C. A device shall be observed, from the instant of immersion until 30 seconds after immersion, for bubbles as to their occurrences and source, unless bubbles occur earlier. Device failure criteria for this test shall be the observation from a package of definite system of bubbles, more than two large bubbles or an attached bubble that grows in size from the instant of immersion for 30 seconds unless failure occurs earlier. Minimum time for testing 25 units will be one hour, 35 minutes. Maximum time will be two hours, 35 minutes for testing 25 units.

The pneumatic gross leak tester will test 25 devices in 15 minutes. Devices with an internal cavity volume greater than, or less than, 0.1 cc can be tested at this rate.

The pneumatic gross leak tester will detect pressure differences between a hermatically sealed micro-electronic device and a gross leak micro-electronic device. The micro-electronic circuit is sealed in a metallic package. The lid is electrostatic welded to the base of the package. A gross leak is usually found between the lid and the base of the package. When a gross leak is detected, the package can be welded again, and then tested again for a gross leak.

SUMMARY OF THE INVENTION

A gross leak detector includes a stationary base, an upper section, and a movable center section. The micro-electronic package is placed in the base in communication with a test chamber having a piston therein. A double acting solenoid valve is actuated and compressed air moves the center section test chamber down over the package to seal the package in the chamber. A second double acting solenoid valve is actuated and compressed air moves a second piston in the test chamber downwardly to compress the air in the test chamber. A pressure sensor is located in the base and is electrically connected to an amplifier. The amplifier signal goes to a voltmeter to be read by the operator. If air leaks into the micro-electronic package, a pressure lower than a known value will be sensed, and the voltmeter will indicate a gross leak. If no air leaks into the package, a high pressure will be sensed and the voltmeter will indicate that the package can go on to a fine leak tester.

DESCRIPTION OF THE PREFERRED EMBODIMENT

Figure 1:
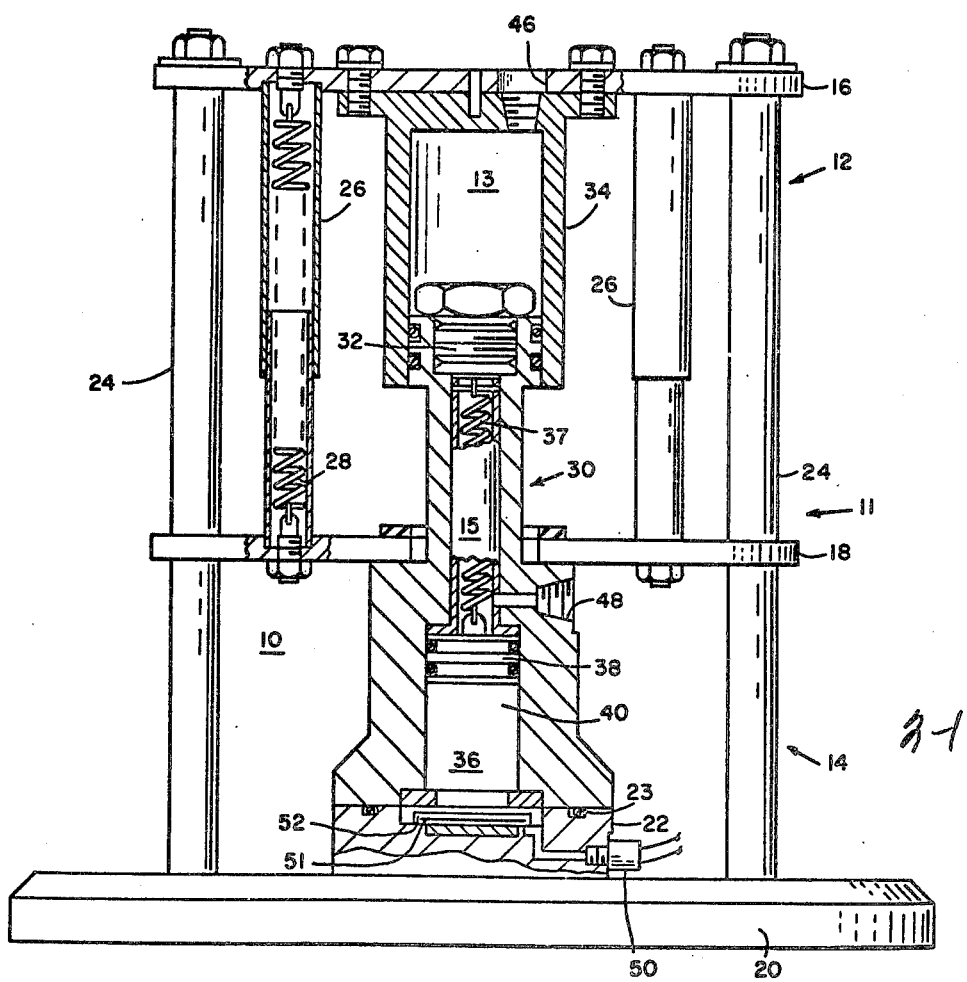
FIG. 1 is an elevation sectional view of the gross leak detector of the present invention.
Figure 2:
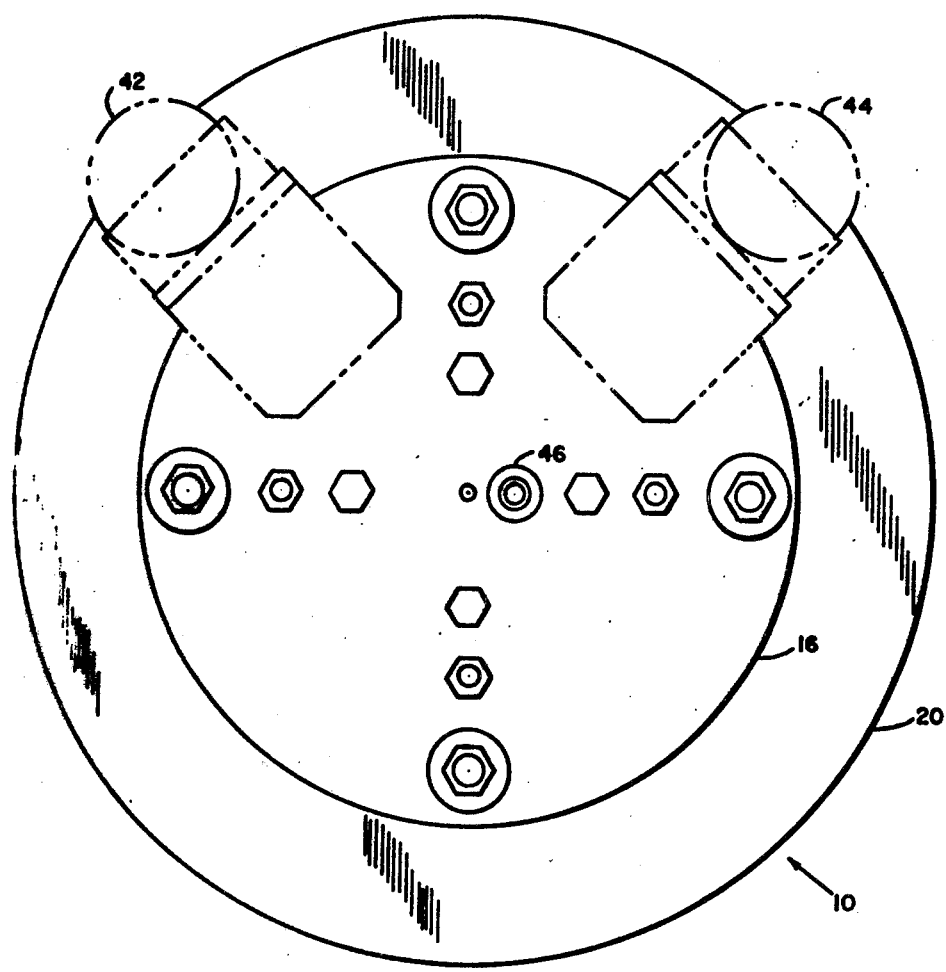
FIG. 2 is a plan view of FIG. 1.

As seen in FIG. 1 a gross leak detector 10 includes an upper section 12, a center section 11, and a lower section 14. Upper section 12 includes a chamber housing 34 secured to plate 16. A plurality of upstanding posts 24 secure the frame base plate 20 and upper plate 16 in spaced relation and guide the center plate 18. Lower section 14 includes a frame base plate 20 and a test chamber base plate 22 secured thereto. A plurality of posts 26 maintain plates 16 and 18 in spaced relation. A spring return mechanism 28 is carried in each post 26 for biased relation of plate 16 and 18. Center section 11 includes a plate 18 secured to test chamber housing assembly 40 includes piston assembly 32, chamber 15, piston assembly 38, and test chamber 36. Spring mechanism 28 retains the test chamber housing assembly 40 in up position. A spring assembly 37 retains the piston 38 in up position. A pair of solenoid valves 42 and 44 (FIG. 2) communicate into openings 46 and 48 which open into chamber 13 and into chamber 15, respectively. A transducer 50 communicates into the test chamber 36 to measure air pressure.

In operation, the micro-electronic packages 52 are inserted into base plate 22. Solenoid 42 is actuated to cause compressed air to enter opening 46, chamber 13 which forces chamber housing assembly 40 down against the "O" ring 23. The package is now sealed in the test chamber 36. Solenoid 44 is actuated to cause compressed air to enter opening 48, chamber 15 which forces piston 38 downwardly and compresses the air in test chamber 36 approximately 2:1. If no air leaks into the package then a high pressure (approximately 9 psi) will be sensed and the voltmeter will indicate a favorable reading. If air leaks into the package (approximately 8 psi) will be sensed and the voltmeter will indicate a gross leak.

We claim:

1. Apparatus for gross leak testing of a micro-electronic package comprising:
   (a) a frame having a vertically movable upper section and a stationary lower section;
   (b) a chamber provided with walls secured to said upper section for movement therewith, said chamber including upper, lower and intermediate portions disposed in communication;
   (c) a test chamber base secured to said lower stationary section and disposed to receive said micro-electronic package therein for testing thereof;
   (d) a first piston mounted in said upper chamber section, said upper chamber section disposd in communication with a first source of air for movement of said piston whereby said upper frame section is moved downwardly for sealing engagement of said lower chamber portion with said test chamber base;

(e) a second piston mounted in said lower chamber portion, said lower chamber portion disposed in communication with a second source of air for movement of said second piston whereby air in said lower chamber portion is compressed to a predetermined value whereby some of said compressed air will leak into said micro-electronic package if said package is defective;

(f) pressure transducer means communicating into said test chamber base for indicating the pressure therein; and, (g) spring biasing means secured between said first and second pistons for biased relation thereof.

2. Apparatus as in claim 1 including spring means disposed for biased relationship of said upper and lower frame sections.

* * * * *